US012347396B2

(12) United States Patent
Mazrouei et al.

(10) Patent No.: US 12,347,396 B2
(45) Date of Patent: Jul. 1, 2025

(54) CIRCUIT DEVICE AND DISPLAY SYSTEM

(71) Applicant: SEIKO EPSON CORPORATION, Tokyo (JP)

(72) Inventors: Sebdani Mahmood Mazrouei, Markham (CA); Kumar Anandabairavasamy Anand, Richmond (CA); Stanislav Zaozerskii, Markham (CA); Yasutoshi Akiba, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/768,374

(22) Filed: Jul. 10, 2024

(65) Prior Publication Data

US 2025/0037673 A1 Jan. 30, 2025

(30) Foreign Application Priority Data

Jul. 11, 2023 (JP) ................................ 2023-113486

(51) Int. Cl.
*G09G 3/34* (2006.01)
*G09G 3/36* (2006.01)

(52) U.S. Cl.
CPC ............ *G09G 3/3426* (2013.01); *G09G 3/36* (2013.01); *G09G 2320/0242* (2013.01); *G09G 2320/0626* (2013.01); *G09G 2320/0686* (2013.01)

(58) Field of Classification Search
CPC .................. G09G 3/3426; G09G 3/36; G09G 2320/0242; G09G 2320/0626; G09G 2320/0686; G09G 2320/0646; G09G 2320/0653; G09G 2360/144; G09G 2360/16
See application file for complete search history.

(56) References Cited

U.S. PATENT DOCUMENTS

| | | | | |
|---|---|---|---|---|
| 11,288,781 | B2 * | 3/2022 | Gadgil .................. | H04N 19/98 |
| 2009/0184917 | A1 * | 7/2009 | Park .................... | G09G 3/3426 345/102 |

(Continued)

FOREIGN PATENT DOCUMENTS

JP 2006-285064 A 10/2006

*Primary Examiner* — Antonio Xavier
(74) *Attorney, Agent, or Firm* — Harness, Dickey & Pierce, P.L.C.

(57) ABSTRACT

A circuit device controls a display device including light source elements and a display panel. The circuit device includes a luminance analysis circuit and a dimmer circuit. The luminance analysis circuit performs luminance analysis on image data of an input image to output luminance information. The dimmer circuit performs local dimming processing for dimming each of the light source elements based on the luminance information and global dimming processing using a global dimming parameter based on a sensor output of an ambient light sensor, to determine light source luminance information indicating light-emission luminance of each of the light source elements. The dimmer circuit performs dimming processing in which a speed to change the light-emission luminance in the global dimming processing is slower than a speed to change the light-emission luminance in the local dimming processing.

8 Claims, 14 Drawing Sheets

(56) References Cited

U.S. PATENT DOCUMENTS

| | | | | |
|---|---|---|---|---|
| 2010/0085374 | A1* | 4/2010 | Lee | G09G 3/3426 345/589 |
| 2011/0141154 | A1* | 6/2011 | Ahn | G09G 3/3426 345/102 |
| 2020/0135074 | A1* | 4/2020 | Wooster | G09G 3/006 |
| 2021/0397034 | A1* | 12/2021 | Taheri | C09K 19/02 |
| 2024/0347013 | A1* | 10/2024 | Jiang | G09G 3/3607 |

* cited by examiner

| LIGHT SOURCE ELEMENT | LOCAL DIMMING | GLOBAL DIMMING | |
|---|---|---|---|
| LG1 | FLLD1 | FDIMG | FLLD1 × FDIMG |
| LG2 | FLLD2 | | FLLD2 × FDIMG |
| LG3 | FLLD3 | | FLLD3 × FDIMG |
| ⋮ | ⋮ | | ⋮ |
| LG48 | FLLD48 | | FLLD48 × FDIMG |

CIRCUIT DEVICE AND DISPLAY SYSTEM

The present application is based on, and claims priority from JP Application Serial Number 2023-113486, filed Jul. 11, 2023, the disclosure of which is hereby incorporated by reference herein in its entirety.

BACKGROUND

1. Technical Field

The present disclosure relates to a circuit device, a display system, and the like.

2. Related Art

JP-A-2006-285064 discloses an image display device that performs, in global dimming, dark adaptation control for converging in 15 seconds when illuminance decreases and light adaptation control for converging in 4 seconds when illuminance increases.

JP-A-2006-285064 described above does not describe how to control light-emission luminance of a light source element with respect to a change in luminance of an image in local dimming.

SUMMARY

An aspect of the present disclosure provides a circuit device that controls a display device including light source elements and a display panel. The circuit device includes a luminance analysis circuit that performs luminance analysis on image data of an input image to output luminance information, and a dimmer circuit that performs local dimming processing for dimming each of the light source elements based on the luminance information and global dimming processing using a global dimming parameter based on a sensor output of an ambient light sensor, to determine light source luminance information indicating light-emission luminance of each of the light source elements. The dimmer circuit performs dimming processing in which a speed to change the light-emission luminance in the global dimming processing is slower than a speed to change the light-emission luminance in the local dimming processing.

Another aspect of the present disclosure provides a display system including the circuit device described above and the display device.

DESCRIPTION OF EMBODIMENTS

Hereinafter, a preferred embodiment of the present disclosure will be described in detail. It should be noted that the present embodiment described below is not intended to unduly limit the content described in the scope of claims, and all components described in the present embodiment are not necessarily essential requirements.

1. Electronic Apparatus, Display System, and Circuit Device

Figure 1:
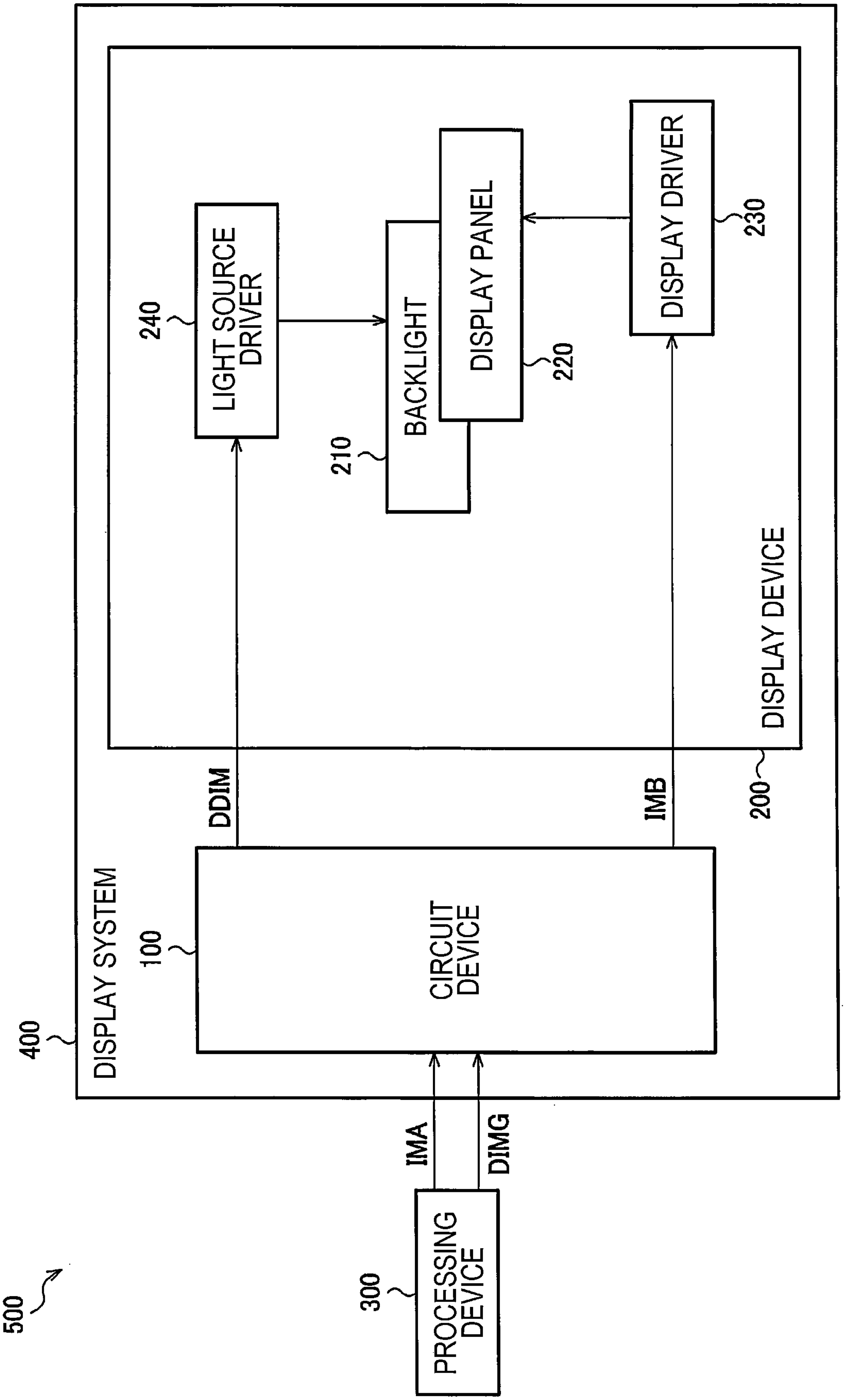
FIG. 1 is a diagram illustrating an example of a configuration of an electronic apparatus.

FIG. 1 illustrates an example of a configuration of an electronic apparatus including a display system of the present embodiment. An electronic apparatus 500 includes a processing device 300 and a display system 400. An example of the electronic apparatus 500 may be an in-vehicle display apparatus including a meter panel, a center information display, a head-up display, or an electronic mirror, a television apparatus, or an information processing apparatus including a display.

The display system 400 includes a circuit device 100 and a display device 200. The circuit device 100 is, for example, an integrated circuit device in which circuit elements are integrated on a semiconductor substrate. Although the circuit device 100 and the display device 200 are illustrated as separate components in FIG. 1, the circuit device 100 may be provided in the display device 200.

The display device 200 includes a backlight 210, a display panel 220, a display driver 230, and a light source driver 240. An example of the display device 200 is a display used for a television apparatus, an information processing apparatus, or the like. Alternatively, the display device 200 may be, for example, a head-mounted display including a projection device for eyes, or a head-up display including a projection device for a screen. When the display device 200 is a head-up display, the display device 200 further includes an optical system for projecting, onto a screen, light emitted from the backlight 210 and transmitted through the display panel 220.

In plan view of the backlight 210, light source elements are two-dimensionally arranged in the backlight 210. The light source elements are light-emitting elements that emit light by power supply, and are, for example, inorganic light-emitting diodes or organic light-emitting diodes. In local dimming control, the amounts of light of the two-dimensionally arranged light source elements are controlled independently of each other. Alternatively, the backlight 210 may be divided into areas. In plan view, light source elements are arranged in each of the areas. The light source elements arranged in an area are controlled to have the same amount of light, and the amounts of light of the respective areas are controlled independently of each other.

An example of the two-dimensional arrangement of the light source elements is a square arrangement in which the light source elements are arranged at all intersections of rows and columns. However, the two-dimensional arrangement is not limited to the square arrangement. For example, the two-dimensional arrangement may be an arrangement called, for example, a rhomboid arrangement or a zigzag arrangement. In this arrangement, the light source elements are arranged at the intersections of the odd-numbered columns and either of the odd-numbered rows or the even-numbered rows, and at the intersections of the even-numbered columns and the other of the odd-numbered rows and the even-numbered rows, and the light source elements are not arranged at the intersections other than those intersections.

The light source driver 240 receives light source luminance data DDIM from the circuit device 100 and drives each of the light source elements of the backlight 210 based on the light source luminance data DDIM. The light source driver 240 is, for example, an integrated circuit device. Two or more light source drivers may be provided, and each of the light source drivers may be a separate integrated circuit device.

The display panel 220 is an electro-optical panel through which light from the backlight 210 is transmitted and which displays an image by controlling a transmittance thereof. For example, the display panel 220 is a liquid crystal display panel.

The display driver 230 receives, from the circuit device 100, image data IMB and a timing control signal for controlling a display timing. The display driver 230 drives the display panel based on the received image data IMB and timing control signal to display an image on the display panel 220.

The processing device 300 transmits image data IMA to the circuit device 100. In addition, the processing device 300 performs global dimming processing based on information regarding the amount of ambient light detected by an ambient light sensor or the like, and transmits the result to the circuit device 100 as a global dimming parameter DIMG. The global dimming parameter is, for example, equal to or greater than 0 and equal to or smaller than 1, and is common to the entire backlight 210. The processing device 300 is a processor such as a CPU, a GPU, a microcomputer, a DSP, an ASIC, or an FPGA. CPU is an abbreviation for Central Processing Unit. GPU is an abbreviation for Graphics Processing Unit. DSP is an abbreviation for Digital Signal Processor. ASIC is an abbreviation for Application Specific Integrated Circuit. FPGA is an abbreviation for Field Programmable Gate Array.

The circuit device 100 receives the image data IMA and the global dimming parameter DIMG and performs local dimming processing of the display device 200 based on the image data IMA. Further, the circuit device 100 performs global dimming processing of the display device 200 based on the global dimming parameter DIMG. In the local dimming, the circuit device 100 performs dimming on light-emission luminance of each light source element of the backlight 210 or each area of the backlight 210 according to luminance of the image data IMA and outputs light source luminance information, which is obtained by the dimming, to the light source driver 240 as light source luminance data DDIM. The circuit device 100 performs, based on the light source luminance information, color correction on the image data IMA and outputs the image data IMB after the color correction to the display driver 230. In the global dimming, the circuit device 100 changes the light-emission luminance of the entire backlight 210 according to the global dimming parameter DIMG.

The circuit device 100 incorporates a function of a display controller. In other words, the circuit device 100 transmits the image data IMB and the timing control signal for controlling the display timing to the display driver 230. Further, the circuit device 100 may perform image processing such as gradation correction, white balance correction, or scaling on the image data IMA or the image data IMB. The circuit device 100 does not necessarily incorporate the function of the display controller, and a display controller may be provided as an integrated circuit device separate from the circuit device 100. In this case, the display controller may be provided in the display device 200. The display controller and the display driver 230 may be configured by separate integrated circuit devices from each other, or may be configured by a single integrated circuit device.

2. Example of Configuration of Circuit Device

Hereinafter, illustration and description of the function of the display controller incorporated in the circuit device 100 will not be given, and illustration and description of dimming and color correction will be given.

Figure 2:
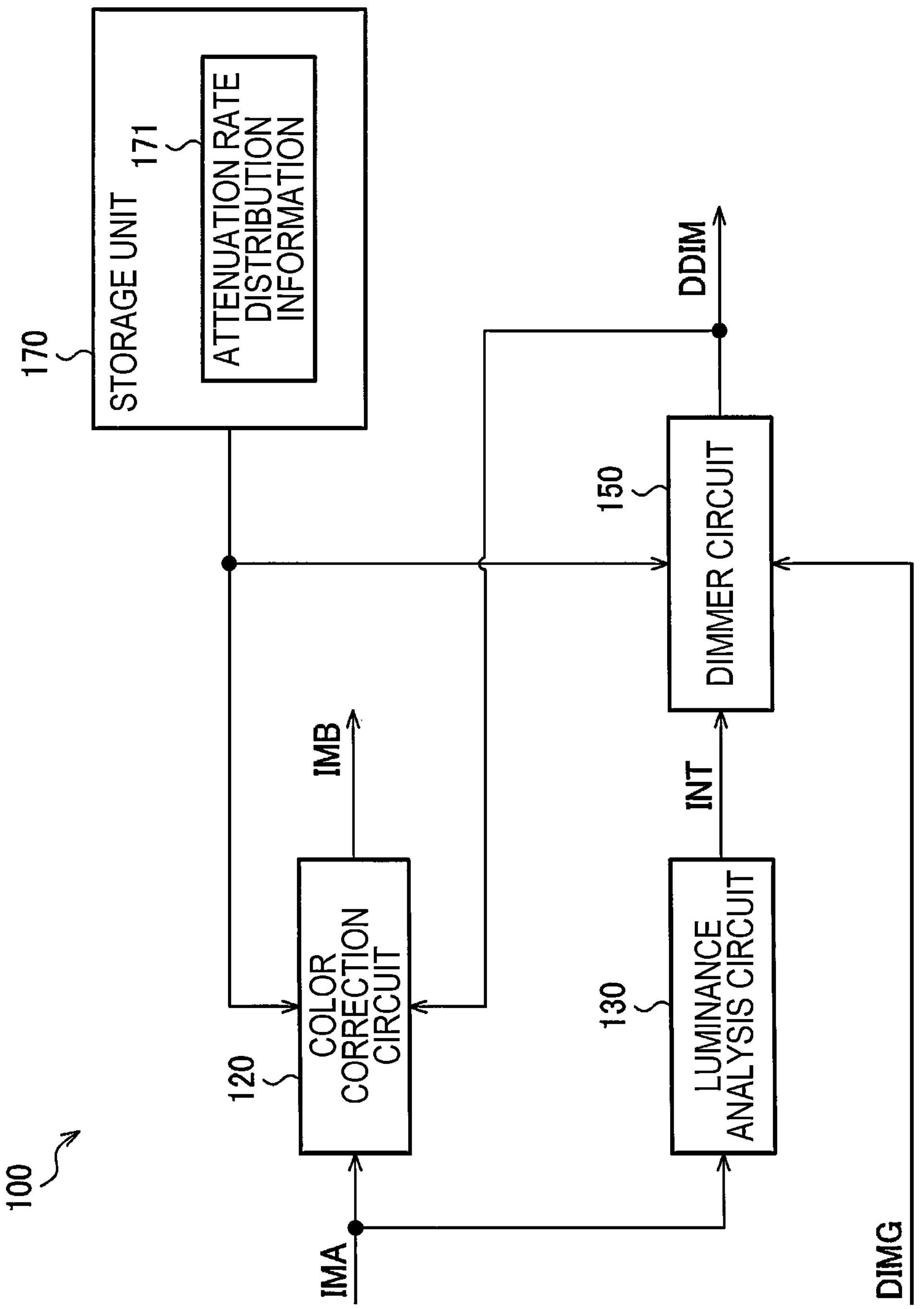
FIG. 2 is a diagram illustrating an example of a configuration of a circuit device.

FIG. 2 illustrates an example of a configuration of the circuit device. The circuit device 100 includes a color correction circuit 120, a luminance analysis circuit 130, a dimmer circuit 150, and a storage unit 170.

The storage unit 170 stores attenuation rate distribution information 171. The storage unit 170 is a register or a memory. The memory is a volatile memory such as a RAM, or a non-volatile memory such as an OTP memory or an EEPROM. RAM is abbreviation for Random Access Memory. OTP is abbreviation for One Time Programmable. EEPROM is abbreviation for Electrically Erasable Programmable Read Only Memory.

The attenuation rate distribution information 171 indicates an attenuation rate distribution of light reaching the display panel from the light source element. The attenuation rate distribution indicates a relationship between a distance from the light source element to a pixel and an attenuation rate of light with which the light source element illuminates the pixel. The attenuation rate distribution is also referred to as an attenuation characteristic or a luminance distribution. The attenuation rate distribution information 171 is, for example, a lookup table or a function indicating the attenuation rate distribution. When the function is a polynomial, the attenuation rate distribution information 171 may be a coefficient of each term of the polynomial.

The circuit device 100 receives the image data IMA from the processing device 300 through an image interface (not illustrated). An image represented by the image data IMA is referred as an input image. Examples of modes of the image interface may be various modes including an LVDS, a parallel RGB mode, and a display port. LVDS is an abbreviation for Low Voltage Differential Signaling.

Figure 3:
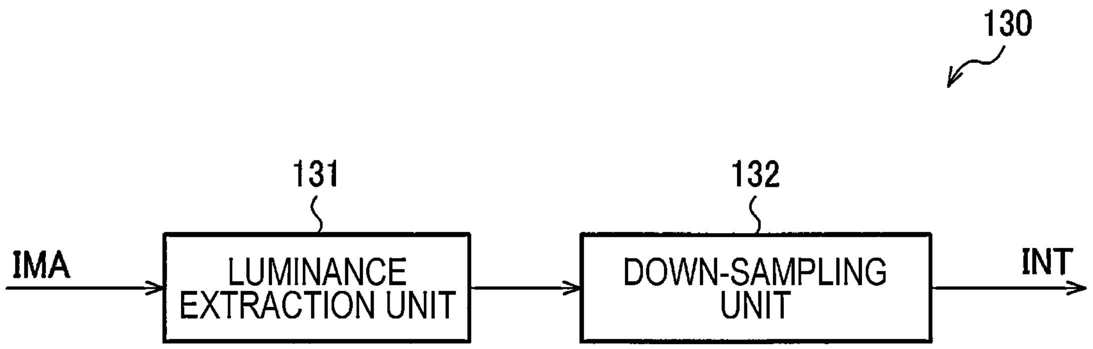
FIG. 3 is a diagram illustrating an example of a detailed configuration of a luminance analysis circuit.

The received image data IMA is input to the luminance analysis circuit 130. The luminance analysis circuit 130 analyzes the luminance of the image data IMA and outputs the obtained result as luminance information INT. The luminance information INT indicates luminance of the image at each position of the input image. FIG. 3 illustrates an example of a configuration of the luminance analysis circuit. The luminance analysis circuit 130 includes a luminance extraction unit 131 and a down-sampling unit 132.

The input image is an RGB color image. In other words, each pixel of the image data IMA has an R pixel value, a G pixel value, and a B pixel value. The luminance extraction unit 131 sets the maximum value out of the R pixel value, the G pixel value, and the B pixel value as a luminance value of the corresponding pixel. Thus, a first luminance image is obtained in which each pixel has one luminance value.

The down-sampling unit 132 down-samples the first luminance image to acquire a second luminance image. The second luminance image has the number of pixels smaller than that of the first luminance image. The down-sampling may be performed in at least one of a horizontal scanning direction and a vertical scanning direction. For example, the number of pixels is down-sampled to ½ or less in both the horizontal scanning direction and the vertical scanning direction. The down-sampling unit 132 outputs the second luminance image as luminance information INT.

Note that the configuration of the luminance analysis circuit 130 is not limited to that described above. For example, the down-sampling unit 132 may be excluded, and the first luminance image may be output as luminance information INT. Alternatively, the luminance extraction unit 131 may obtain the first luminance image from a luminance value, for example, Y in a YCrCb space calculated by multiplying an RGB pixel value by a coefficient.

The dimmer circuit 150 generates, based on the luminance information INT, light source luminance information indicating the light-emission luminance of each of the light source elements. This corresponds to local dimming processing. The dimmer circuit 150 performs global dimming processing using the light source luminance information obtained by the local dimming processing and the global dimming parameter DIMG and outputs the obtained result as light source luminance data DDIM. The global dimming processing is processing for adjusting the light-emission luminance of each of the light source elements determined by the local dimming processing to be bright or dark as a whole. As described with reference to FIG. 1, the global dimming parameter DIMG is input from the processing device 300 to the circuit device 100. However, the circuit device 100 may perform the global dimming processing based on the information regarding the amount of ambient light to acquire the global dimming parameter DIMG.

In the local dimming processing, the dimmer circuit 150 determines, from luminance information INT of an image around the light source element, light-emission luminance of the corresponding light source element. When the luminance information INT of the image around the light source element changes, the dimmer circuit 150 changes the light-emission luminance of the light source element according to the change. In the global dimming processing, when the global dimming parameter DIMG changes, the dimmer circuit 150 changes the light-emission luminance of the entire backlight 210 according to the change. When attention is paid to a certain one light source element, the light-emission luminance of the light source element changes by following the change in the global dimming parameter DIMG. At this time, the dimmer circuit 150 performs dimming processing such that a speed to change the light-emission luminance in the global dimming processing is slower than a speed to change the light-emission luminance in the local dimming processing.

In other words, when ambient brightness changes, the light-emission luminance of the backlight 210 changes relatively slowly, and when the luminance of the image changes, the light-emission luminance of the corresponding light source element changes relatively fast. For example, the ambient brightness is unstable as in a case where a vehicle is temporarily in a shadow of a building or the like. For this reason, in the global dimming, it is possible to reduce a frequent change in the amount of light of the backlight 210 and to reduce, for example, screen flickering by delaying a response of dimming with respect to the ambient brightness. On the other hand, in the local dimming, the light-emission luminance of the light source element quickly changes in response to the change in luminance of the image, and thus it is possible to perform dimming which appropriately follows a moving picture such as a moving image. According to the present embodiment, it is possible to perform appropriate dimming in both the global dimming and the local dimming as described above.

The color correction circuit 120 computes lighting luminance information based on the light source luminance data DDIM output from the dimmer circuit 150 and the attenuation rate distribution information 171 stored in the storage unit 170. The lighting luminance information indicates lighting luminance in each pixel of the display panel 220 when the display panel 220 is illuminated by the backlight 210. The computation of the lighting luminance will be described below in detail with reference to FIG. 14. The color correction circuit 120 performs, based on the lighting luminance information, color correction on the image data IMA and outputs the image data IMB after the correction. Specifically, the color correction circuit 120 multiplies pixel data of each pixel by a reciprocal number of luminance of light reaching the pixel and sets the obtained result as new pixel data. An image represented by the image data IMB is referred to as an output image.

The circuit device 100 transmits the image data IMB of the output image to the display driver 230 through an image interface (not illustrated). Examples of modes of the image interface may be various modes including an LVDS, a parallel RGB mode, and a display port.

The color correction circuit 120, the luminance analysis circuit 130, and the dimmer circuit 150 are logic circuits that process digital signals. Each of the color correction circuit 120, the luminance analysis circuit 130, and the dimmer circuit 150 may be configured by a separate logic circuit, or some or all of the above circuits may be configured by an integrated logic circuit. Alternatively, a processor such as a DSP may execute an instruction set or a program in which functions of the color correction circuit 120, the luminance analysis circuit 130, and the dimmer circuit 150 are described, thereby implementing the functions of these circuits. Alternatively, the circuit device 100 may be a processor such as a CPU, a GPU, a microcomputer, a DSP, an ASIC, or an FPGA. The processor may execute an instruction set or a program in which a function of each unit of the circuit device 100 is described, thereby implementing the function of the circuit device 100.

Figure 4:
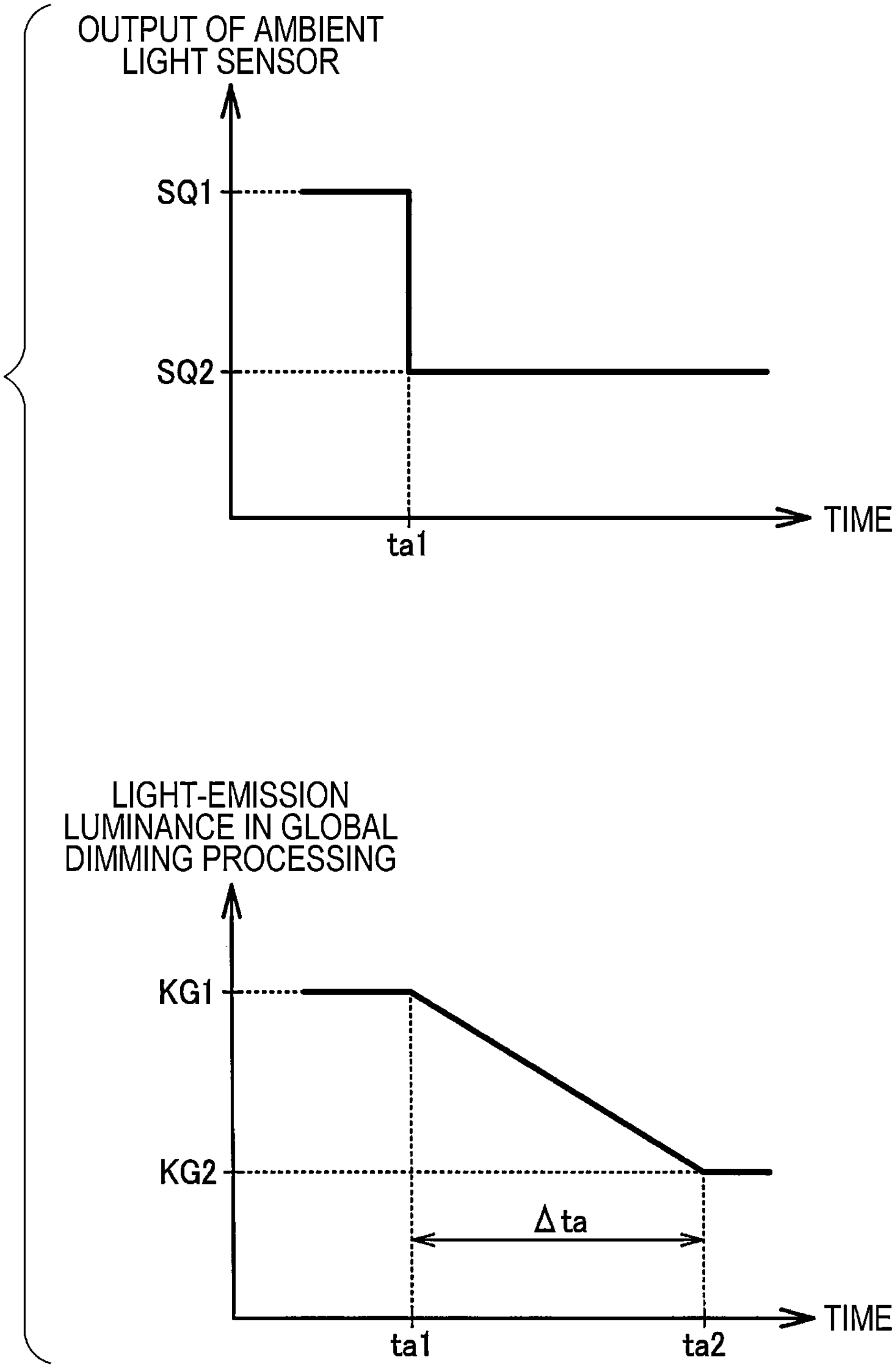
FIG. 4 is a diagram illustrating an example of a change in light-emission luminance in global dimming processing.
Figure 5:
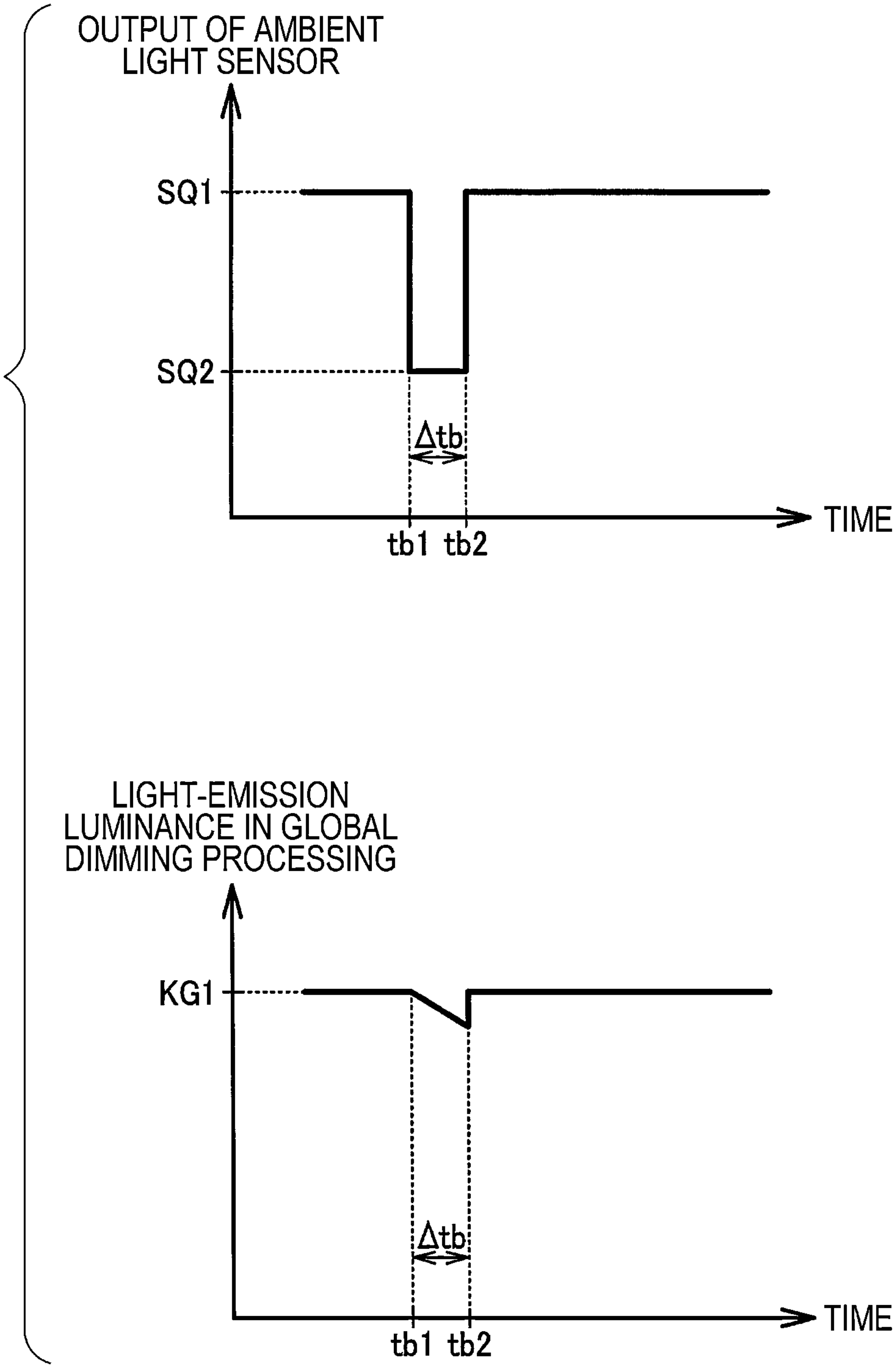
FIG. 5 is a diagram illustrating an example of a change in light-emission luminance in global dimming processing.

FIGS. 4 and 5 illustrate examples of changes in light-emission luminance in the global dimming processing. In the following description, attention is paid to light-emission luminance of any one of the light source elements included in the backlight 210. However, light-emission luminance of the other light source elements are controlled in the same manner.

FIG. 4 illustrates an example of a case where ambient brightness has decreased and is being maintained in the decreased state. As illustrated in an upper part of FIG. 4, it is assumed that the output of the ambient light sensor drops from SQ1 to SQ2 at time ta1. At this time, the global dimming parameter DIMG similarly decreases at time ta1.

As illustrated in a lower part of FIG. 4, it is assumed that the light-emission luminance corresponding to the output SQ1 of the ambient light sensor is defined as KG1 and the light-emission luminance corresponding to the output SQ2 of the ambient light sensor is defined as KG2. The dimmer circuit 150 changes the light-emission luminance from KG1 to KG2 at a predetermined speed. The speed to change the light-emission luminance is, for example, a slope of the change in the light-emission luminance with respect to time, or the time taken for the light-emission luminance to converge from KG1 to KG2. FIG. 4 illustrates an example where the dimmer circuit 150 allows the light-emission luminance to converge to KG2 for time Δta. In this case, the light-emission luminance converges to KG2 at time ta2 elapsed by Δta from the time ta1. As illustrated in FIG. 4, the light-emission luminance may change with a constant slope, or the light-emission luminance may gradually approach KG2 exponentially. Alternatively, the light-emission luminance may change in a step function manner to be KG1 until immediately before the time ta2 and to be KG2 at the time ta2. Alternatively, the light-emission luminance may change stepwise from KG1 to KG2.

FIG. 5 illustrates an example of a case where ambient brightness returns to original brightness after temporarily decreasing. As illustrated in an upper part of FIG. 5, it is assumed that the output of the ambient light sensor drops from SQ1 to SQ2 at time tb1 and returns to SQ1 at time tb2. At this time, the global dimming parameter DIMG similarly drops at the time tb1 and returns to an original value at the time tb2. It is assumed that an interval between the times tb1 and tb2 is defined as Δtb and that Δtb is shorter than Δta.

As illustrated in a lower part of FIG. 5, the dimmer circuit 150 starts to decrease the light-emission luminance at a predetermined speed from KG1 at the time tb1, and starts to increase the light-emission luminance at a predetermined speed at the time tb2. Since Δtb is shorter than Δta, the light-emission luminance starts to increase before decreasing to KG2. When Δtb is sufficiently shorter than Δta, the decrease in the light-emission luminance is smaller than the difference between KG1 and KG2. The speed at which the light-emission luminance increases may be faster than the speed at which the light-emission luminance decreases, or may be equal to the speed at which the light-emission luminance decreases. Although FIG. 5 illustrates an example in which the light-emission luminance immediately returns to KG1 at the time tb2, the light-emission luminance may return to KG1 gradually in stages or in steps after the time tb2, similarly to the case where the light-emission luminance decreases.

Figure 6:
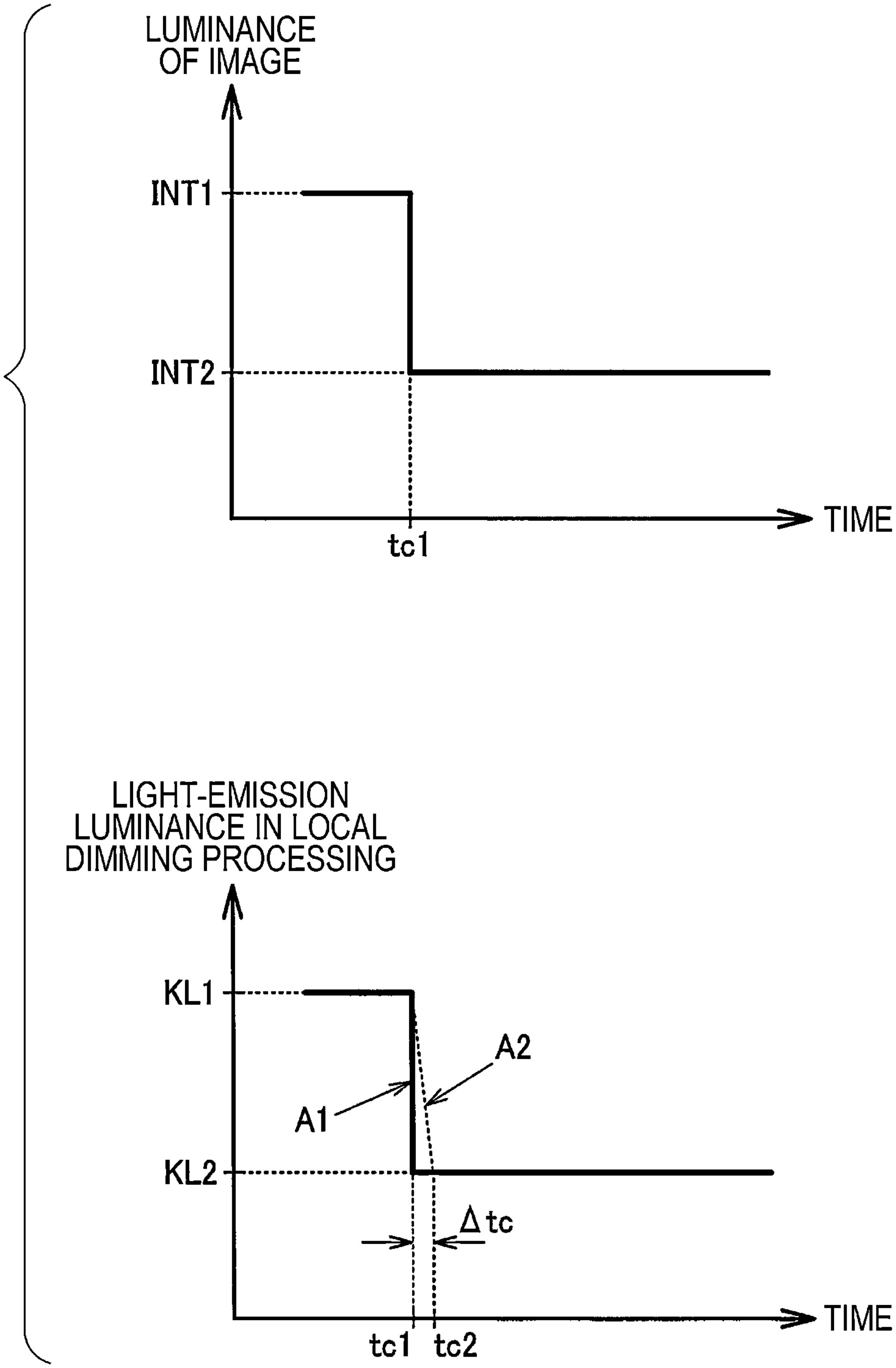
FIG. 6 is a diagram illustrating an example of a change in light-emission luminance in local dimming processing.
Figure 7:
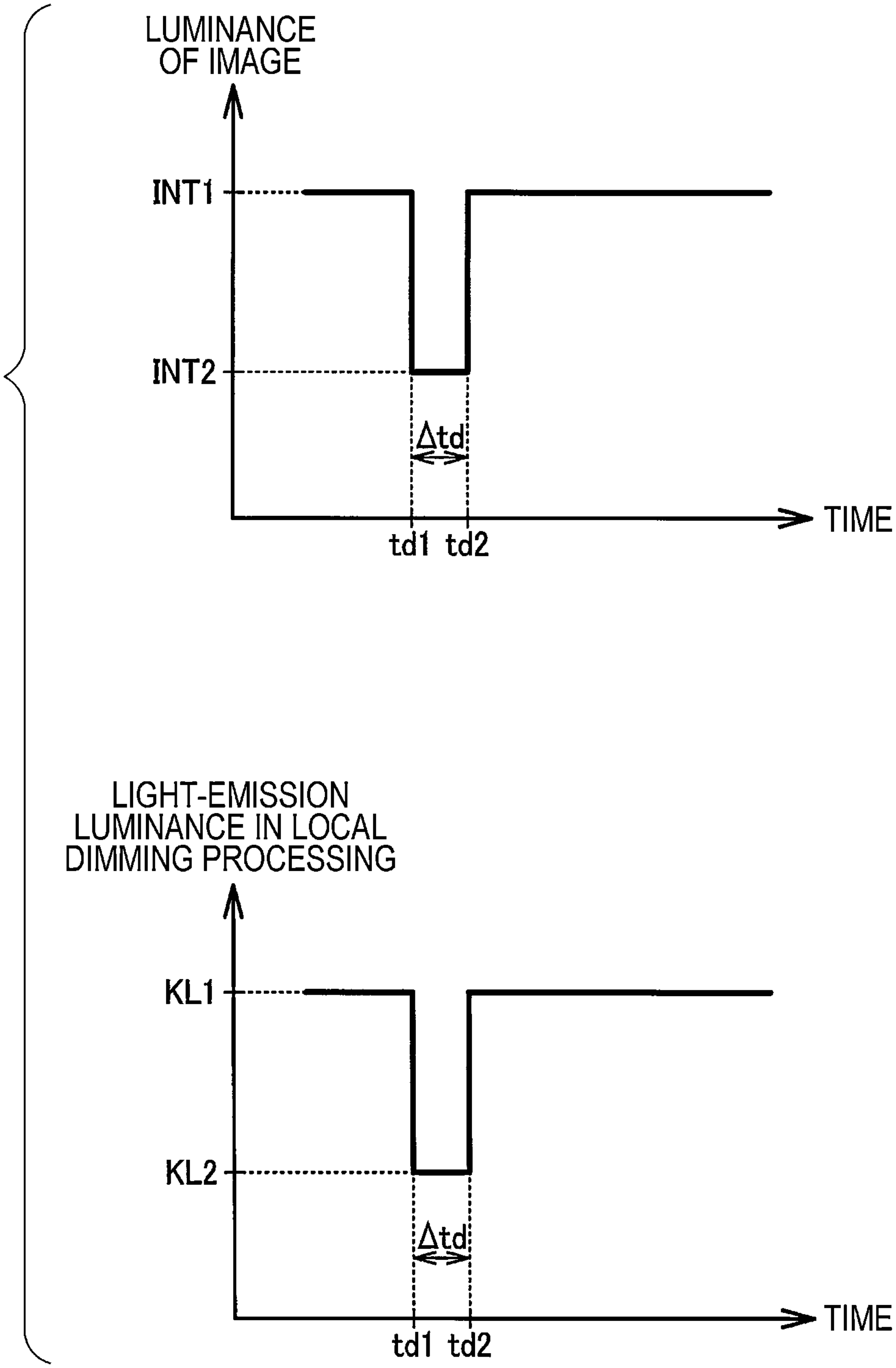
FIG. 7 is a diagram illustrating an example of a change in light-emission luminance in local dimming processing.

FIGS. 6 and 7 illustrate examples of changes in light-emission luminance in the local dimming processing. In the following description, attention is paid to light-emission luminance of any one of the light source elements included in the backlight 210. However, light-emission luminance of the other light source elements are controlled in the same manner.

FIG. 6 illustrates an example of a case where luminance of an image around the light-emitting element has decreased and is being maintained in the decreased state. As illustrated in an upper part of FIG. 6, it is assumed that the luminance of the image around the light-emitting element drops from INT1 to INT2 at time tc1.

As illustrated in a lower part of FIG. 6, it is assumed that the light-emission luminance corresponding to the luminance INT1 of the image is defined as KL1 and the light-emission luminance corresponding to the luminance INT2 of the image is defined as KL2. The dimmer circuit 150 changes the light-emission luminance from KL1 to KL2 at a predetermined speed. The speed to change the light-emission luminance is, for example, a slope of the change in the light-emission luminance with respect to time, or the time taken for the light-emission luminance to converge from KL1 to KL2. A line A1 in FIG. 6 indicates an example in which the dimmer circuit 150 immediately changes the light-emission luminance from KL1 to KL2 at the time tc1. A line A2 in FIG. 6 indicates an example in which the dimmer circuit 150 allows the light-emission luminance to converge to KL2 for time Δtc. In the case of the line A2, the light-emission luminance converges to KL2 at time tc2 elapsed by Δtc from the time tc1. As indicated by the line A2, the light-emission luminance may change with a constant slope, or the light-emission luminance may gradually approach KL2 exponentially. Alternatively, the light-emission luminance may change in a step function manner to be KL1 until immediately before the time tc2 and to be KL2 at the time tc2. Alternatively, the light-emission luminance may change stepwise from KL1 to KL2. The line A1 can also be considered as a case where Δtc=0 in the line A2.

The speed to decrease the light-emission luminance in the local dimming processing is faster than the speed to decrease the light-emission luminance in the global dimming. That is, Δtc is shorter than Δta.

FIG. 7 illustrates an example of a case where the luminance of the image around the light-emitting element returns to original luminance after temporarily decreasing. As illustrated in an upper part of FIG. 7, it is assumed that the luminance of the image around the light-emitting element drops from INT1 to INT2 at time td1 and returns to INT1 at time td2. It is assumed that an interval between the times td1 and td2 is defined as Δtd and that Δtd is substantially equal to Δtb and longer than Δtc.

As illustrated in a lower part of FIG. 7, the dimmer circuit 150 starts to decrease the light-emission luminance at a predetermined speed from KL1 at the time td1, and starts to increase the light-emission luminance at a predetermined speed at the time td2. Since Δtd is longer than Δtc, the light-emission luminance starts to increase after decreasing to KL2. The speed at which the light-emission luminance increases may be faster than the speed at which the light-emission luminance decreases, or may be equal to the speed at which the light-emission luminance decreases. FIG. 7 illustrates an example in which the light-emission luminance immediately decreases to KL2 at the time td1 and immediately returns to KL1 at the time td2. However, the light-emission luminance may change gradually in stages or in steps when the light-emission luminance decreases or increase.

As described above, even when the ambient brightness temporarily changes in the global dimming, the response of the dimming to the change can be delayed. On the other hand, in the local dimming, when the luminance of the image around the light source element changes, the response of the dimming can be made to follow the change. This enables appropriate dimming in both the global dimming and the local dimming.

3. Example of Detailed Configuration

Figure 8:
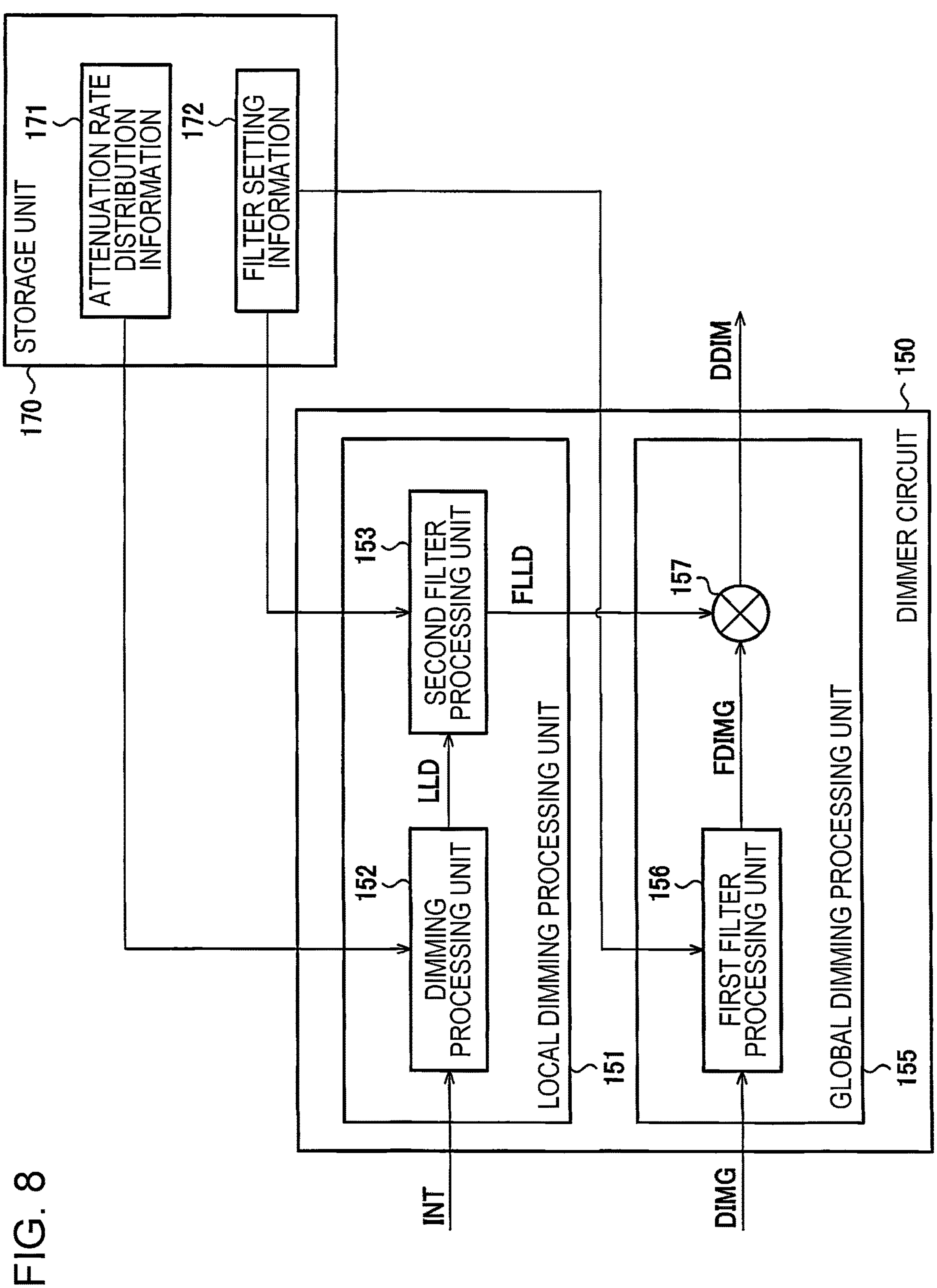
FIG. 8 is a diagram illustrating a first detailed configuration example of a dimmer circuit and a storage unit.

FIG. 8 illustrates a first detailed configuration example of the dimmer circuit and the storage unit. The dimmer circuit 150 includes a local dimming processing unit 151 and a global dimming processing unit 155. The storage unit 170 stores attenuation rate distribution information 171 and filter setting information 172. The attenuation rate distribution information 171 and the filter setting information 172 can be written in the storage unit 170 via an interface (not illustrated) from outside of the circuit device 100. Outside of the circuit device 100 is, for example, the processing device 300.

The local dimming processing unit 151 performs the local dimming processing to determine light-emission luminance of each of the light source elements of the backlight 210 and to output information indicating the light-emission luminance of each of the light source elements as light source luminance information FLLD. The light-emission luminance in the light source luminance information FLLD changes at a predetermined speed with respect to the change in luminance of the image as described with reference to FIGS. 6 and 7. The local dimming processing unit 151 includes a dimming processing unit 152 and a second filter processing unit 153.

The dimming processing unit 152 generates light source luminance information LLD indicating the light-emission luminance of each of the light source elements, based on the luminance information INT and the attenuation rate distribution information 171. The light-emission luminance in the light source luminance information LLD is light-emission luminance before the processing for changing at a predetermined speed with respect to the change in luminance of the image and is, for example, light-emission luminance which immediately responds to the luminance in change of the image. Details of the dimming processing will be described below with reference to FIGS. 12 and 13, but the dimming processing is not limited thereto. For example, the dimming processing unit 152 may perform low-pass filter processing and down-sampling processing on the luminance image, which is the luminance information INT, and may use the result as the light-emission luminance of each of the light source elements. In this case, use of the attenuation rate distribution information 171 may be unnecessary.

The second filter processing unit 153 performs second filter processing on the light-emission luminance of each of the light source elements contained in the light source luminance information LLD to generate light source luminance information FLLD. By the second filter processing, the light-emission luminance of each of the light source elements changes at a predetermined speed with respect to the change in luminance of the image as described with reference to FIGS. 6 and 7. The filter setting information 172 contains information for setting filter characteristics of the second filter processing. In other words, the filter setting information 172 contains information for setting a speed to change the light-emission luminance in response to the change in luminance of the image. The speed at which the light-emission luminance increases and the speed at which the light-emission luminance decreases may be set individually.

The second filter processing is low-pass filtering in a time direction, for example. The filter setting information 172 contains information regarding a cutoff frequency of a low-pass filter. Alternatively, the second filter processing may be processing in which the maximum variation amount per frame is determined, and the light-emission luminance is changed by a variation amount less than or equal to the maximum variation amount. In this case, the filter setting information 172 contains information regarding the maximum variation amount per frame.

The global dimming processing unit 155 performs global dimming processing on the light source luminance information FLLD to generate light source luminance data DDIM. The light-emission luminance in the light source luminance data DDIM changes at a predetermined speed with respect to the change in ambient brightness as described with reference to FIGS. 4 and 5, and changes at a predetermined speed with respect to the change in luminance of the image as described with reference to FIGS. 6 and 7. The global dimming processing unit 155 includes a first filter processing unit 156 and a multiplication unit 157. The first filter processing unit 156 performs first filter processing on the global dimming parameter DIMG to generate global dimming parameter FDIMG after the first filter processing. The filter setting information 172 contains information for setting filter characteristics of the first filter processing. In other words, the filter setting information 172 contains information for setting a speed to change the light-emission luminance in response to the change in global dimming parameter DIMG. The speed at which the light-emission luminance increases and the speed at which the light-emission luminance decreases may be set individually.

The first filter processing is low-pass filtering in a time direction, for example. The filter setting information 172 contains, for example, information regarding a cutoff frequency of the low-pass filter. The cutoff frequency in the first filter processing is lower than the cutoff frequency in the second filter processing.

Alternatively, the first filter processing may be processing in which the maximum variation amount per frame is determined, and the light-emission luminance is changed by a variation amount less than or equal to the maximum variation amount. In this case, the filter setting information 172 contains information regarding the maximum variation amount per frame. The maximum variation amount in the first filter processing is smaller than the maximum variation amount in the second filter processing.

The multiplication unit 157 performs multiplication processing on the global dimming parameter FDIMG after the first filter processing and the light source luminance information FLLD after the second filter processing and outputs the obtained result as the light source luminance data DDIM. By the first filter processing and the multiplication processing, the luminance of the backlight 210 changes at a predetermined speed with respect to the change in ambient brightness as described with reference to FIGS. 4 and 5.

Figure 9:
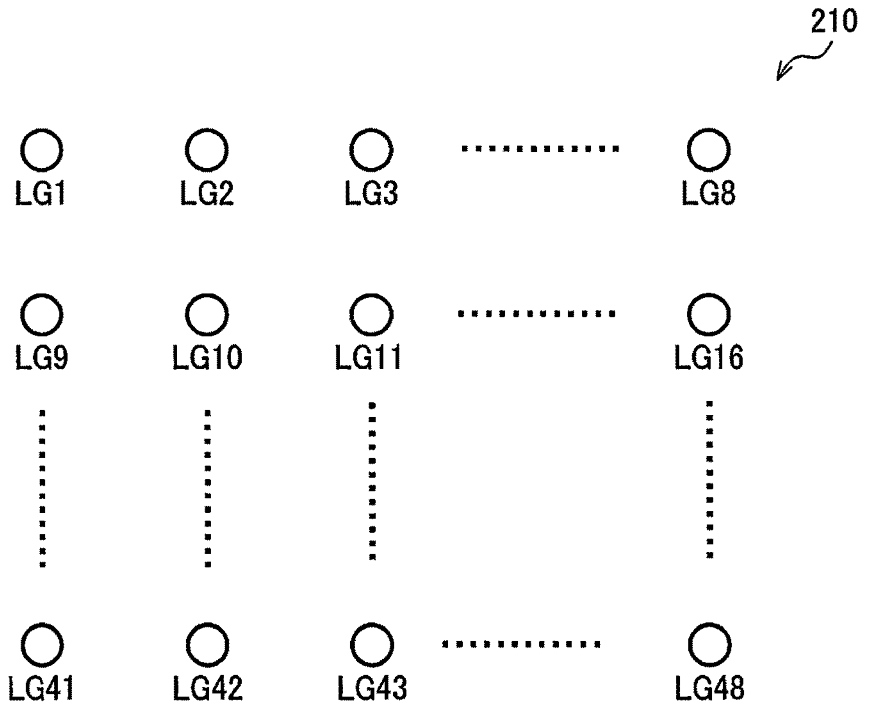
FIG. 9 is a diagram of multiplication processing.

FIG. 9 illustrates a diagram of the multiplication processing. In the following description, it is assumed that the backlight 210 includes light source elements LG1 to LG48 arranged in a matrix of six rows and eight columns.

The second filter processing unit 153 of the local dimming processing unit 151 outputs light-emission luminance FLLDp of a light source element LGp, where p is an integer of 1 or more and 48 or less. The first filter processing unit 156 of the global dimming processing unit 155 outputs a common global dimming parameter FDIMG to the light source elements LG1 to LG48. The multiplication unit 157 multiplies the light-emission luminance FLLDp of the light source element LGp by the global dimming parameter FDIMG and outputs the obtained result as the light source luminance data DDIM. FIG. 9 illustrates an example in which the multiplication processing is simple multiplication, but the multiplication processing is not limited thereto and may include, for example, multiplication or addition of coefficients.

Figure 10:
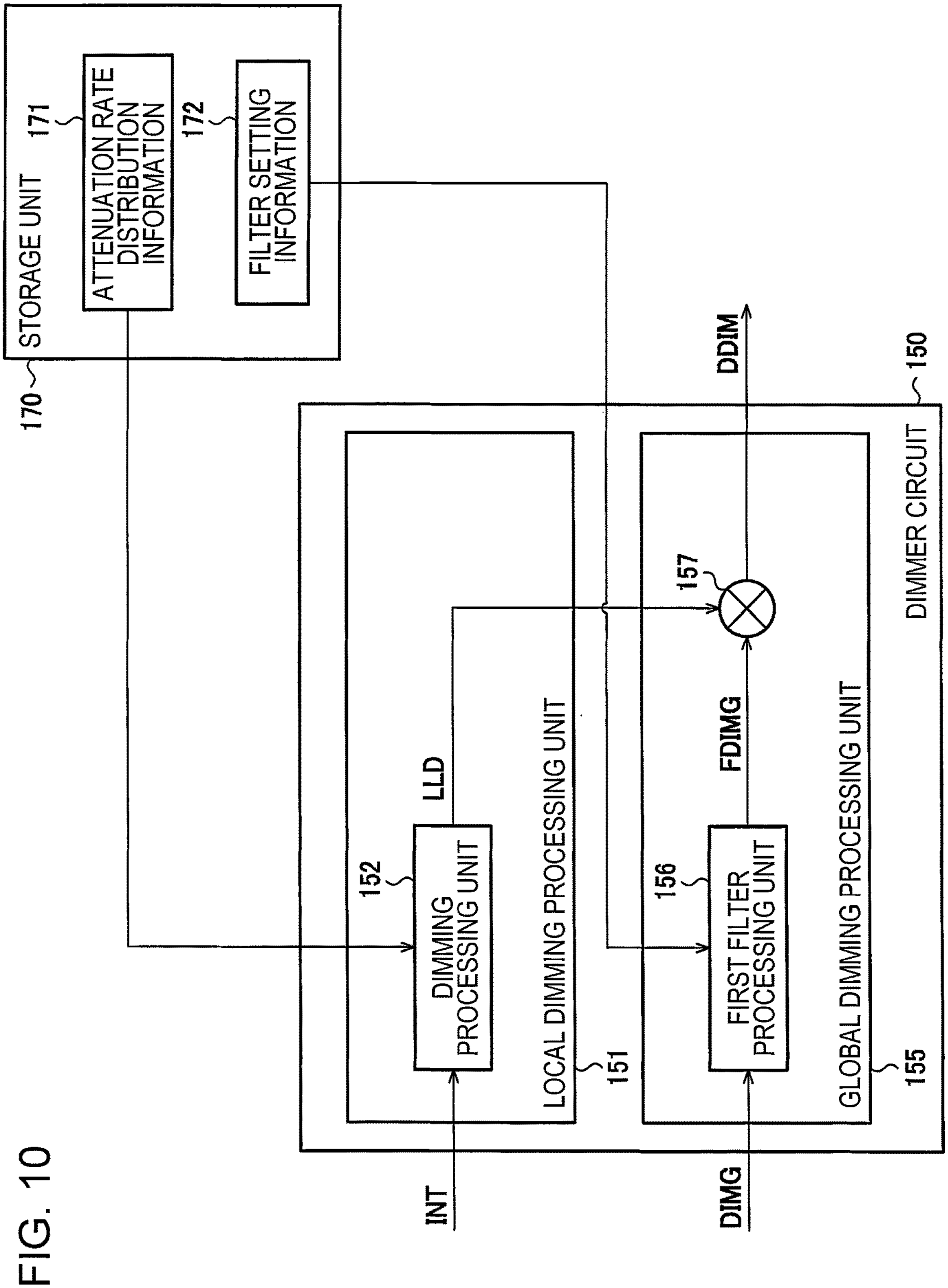
FIG. 10 is a diagram illustrating a second detailed configuration example of a dimmer circuit and a storage unit.

FIG. 10 illustrates a second detailed configuration example of the dimmer circuit and the storage unit. Differences from the first detailed configuration example will be described. In the second detailed configuration example, the local dimming processing unit 151 does not include the second filter processing unit 153. The multiplication unit 157 of the global dimming processing unit 155 performs multiplication processing on the global dimming parameter FDIMG after the first filter processing and the light source luminance information LLD output by the dimming processing unit 152.

Figure 11:
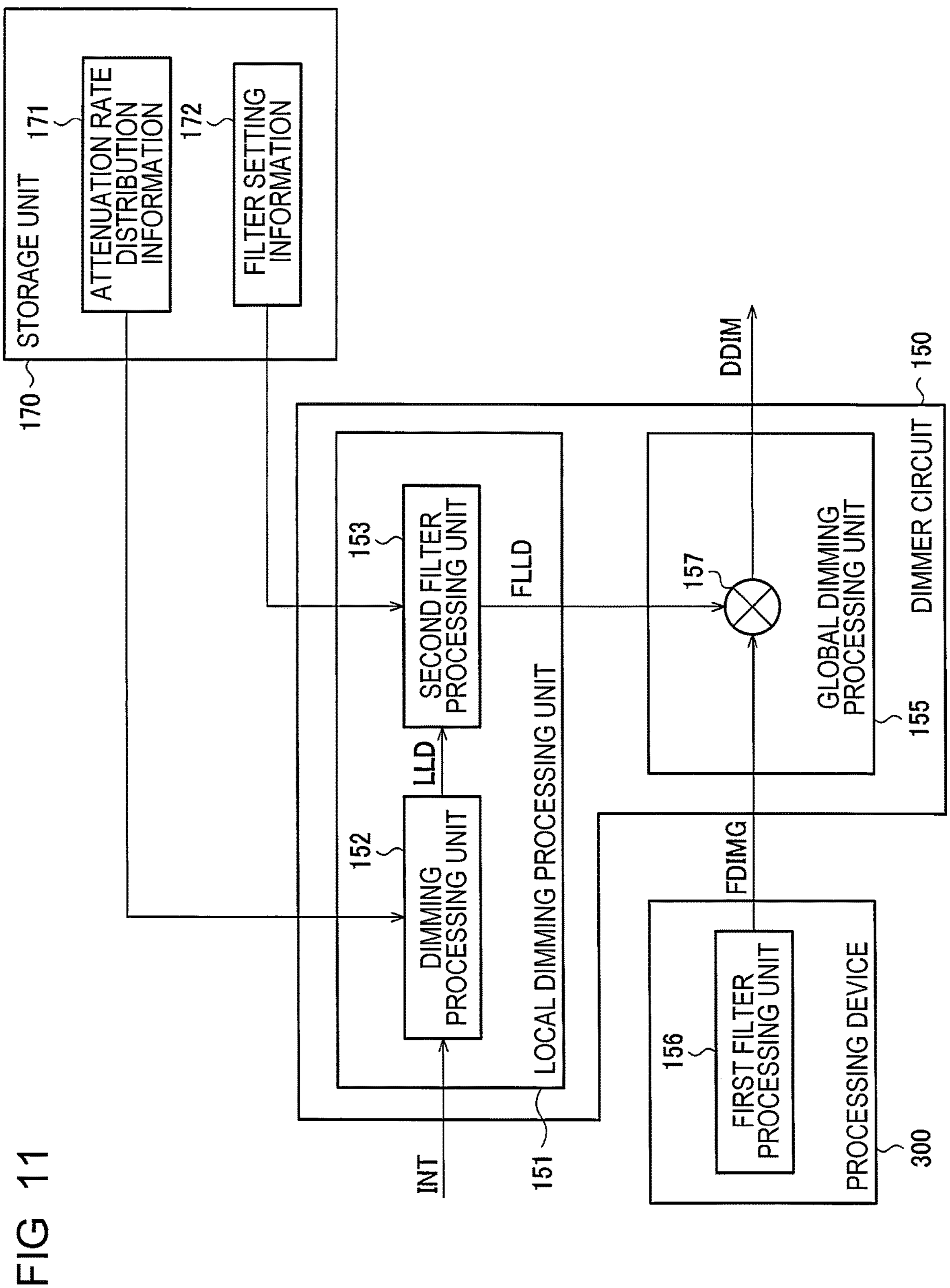
FIG. 11 is a diagram illustrating a third detailed configuration example of a dimmer circuit and a storage unit.

FIG. 11 illustrates a third detailed configuration example of the dimmer circuit and the storage unit. Differences from the first detailed configuration example will be described. In the third detailed configuration example, the global dimming processing unit 155 does not include the first filter processing unit 156, and the processing device 300 includes the first filter processing unit 156. The multiplication unit 157 performs multiplication processing on the global dimming parameter FDIMG input from the processing device 300 after the first filter processing and the light source luminance information FLLD after the second filter processing. The second filter processing unit 153 may be excluded, and the multiplication unit 157 may perform multiplication processing on the global dimming parameter FDIMG input from the processing device 300 after the first filter processing and the light source luminance information FLLD output by the dimming processing unit 152.

In the present embodiment, the circuit device 100 controls the display device 200 including the light source elements and the display panel 220. The circuit device 100 includes the luminance analysis circuit 130 and the dimmer circuit 150. The luminance analysis circuit 130 performs luminance analysis on the image data IMA of the input image to output the luminance information INT. The dimmer circuit 150 determines the light source luminance information indicating the light-emission luminance of each of the light source elements by performing the local dimming processing for dimming each of the light source elements based on the luminance information INT and the global dimming processing using the global dimming parameter DIMG based on the sensor output of the ambient light sensor. The dimmer circuit 150 performs the dimming processing in which the speed to change the light-emission luminance in the global dimming processing is slower than the speed to change the light-emission luminance in the local dimming processing.

According to the present embodiment, the change in the light-emission luminance in the global dimming is relatively slower than the change in the light-emission luminance in the local dimming. In other words, when ambient brightness changes, the light-emission luminance of the backlight 210 changes relatively slowly, and when the luminance of the image changes, the light-emission luminance of the corresponding light source element changes relatively fast. Accordingly, it is possible to reduce a frequent change in the amount of light of the backlight 210 and to reduce, for example, screen flickering by delaying the response of dimming with respect to the ambient brightness in the global dimming. On the other hand, in the local dimming, the light-emission luminance of the light source element quickly changes in response to the change in luminance of the image, and thus it is possible to perform dimming which appropriately follows a moving picture such as a moving image. According to the present embodiment, it is possible to perform appropriate dimming in both the global dimming and the local dimming.

In the present embodiment, the dimmer circuit 150 may perform the first filter processing on the global dimming parameter DIMG based on a first time constant. Accordingly, the dimmer circuit 150 makes the speed to change the light-emission luminance in the global dimming processing slower than the speed to change the light-emission luminance in the local dimming processing.

According to the present embodiment, the first filter processing is performed on the global dimming parameter DIMG based on the first time constant. Accordingly, when the global dimming parameter DIMG changes, the light-emission luminance of the backlight 210 changes with the first time constant. With the first time constant, the speed to change the light-emission luminance in the global dimming processing can be made slower than the speed to change the light-emission luminance in the local dimming processing.

The first time constant is a time constant indicating the speed of change in the light-emission luminance determined by the first filter processing. For example, the first filter processing is low-pass filtering, and the first time constant is a time constant corresponding to the cutoff frequency of the low-pass filter. Alternatively, the first time constant may be a time constant indicating a time at which the change in the light-emission luminance converges. For example, the first filter processing may be processing in which the maximum variation amount per frame is determined, and the light-emission luminance is changed by a variation amount less than or equal to the maximum variation amount. In this case, the first time constant is a time until the change in the light-emission luminance converges when the light-emission luminance is changed per frame by the variation amount.

In the present embodiment, the dimmer circuit 150 may perform second filter processing, based on the second time constant shorter than the first time constant, on the result of the local dimming processing.

According to the present embodiment, the first filter processing based on the first time constant is performed on the global dimming parameter DIMG, and the second filter processing based on the second time constant is performed on the result of the local dimming processing. Since the second time constant is shorter than the first time constant, the speed to change the light-emission luminance in the global dimming processing can be made slower than the speed to change the light-emission luminance in the local dimming processing.

The second time constant is a time constant indicating the speed of change in the light-emission luminance determined by the second filter processing. For example, the second filter processing is low-pass filtering, and the second time constant is a time constant corresponding to the cutoff frequency of the low-pass filter. Alternatively, the second time constant may be a time constant indicating a time at which the change in the light-emission luminance converges. For example, the second filter processing may be processing in which the maximum variation amount per frame is determined, and the light-emission luminance is changed by a variation amount less than or equal to the maximum variation amount. In this case, the second time constant is a time until the change in the light-emission luminance converges when the light-emission luminance is changed per frame by the variation amount.

In the present embodiment, the dimmer circuit 150 may receive, from outside of the circuit device 100, the global dimming parameter FDIMG subjected to the first filter processing based on the first time constant. The dimmer circuit 150 may determine the light source luminance information by using the result of the local dimming processing and the global dimming parameter FDIMG.

According to the present embodiment, the external device such as the processing device 300 performs the first filter processing based on the first filter processing on the global dimming parameter DIMG. Thus, the first time constant can be controlled by the external device such as the processing device 300. In this case, the dimmer circuit 150 sets the second time constant of the second filter processing to a time constant shorter than the first time constant. Accordingly, the speed to change the light-emission luminance in the global dimming processing can be made slower than the speed to change the light-emission luminance in the local dimming processing.

In the present embodiment, the dimmer circuit 150 may perform dimming processing in which the speed to decrease the light-emission luminance in the global dimming processing is slower than the speed to decrease the light-emission luminance in the local dimming processing.

From the viewpoint of visibility, it is desirable that the backlight 210 quickly brightens when the ambient brightness increases. On the other hand, it is desirable that the dimming of the backlight 210 does not follow when the ambient brightness temporarily decreases. According to the present embodiment, since the speed to decrease the light-emission luminance in the global dimming processing is slower than the speed to decrease the light-emission luminance in the local dimming processing, the dimming of the backlight 210 is less likely to follow when the ambient brightness temporarily decreases.

In the present embodiment, the dimmer circuit 150 may perform the dimming processing in which the speed to increase the light-emission luminance in the local dimming processing is faster than the speed to increase the light-emission luminance in the global dimming processing.

In the local dimming, it is desirable that the light source luminance of each of the light-emitting elements quickly follows the luminance around the light-emitting element. According to the present embodiment, since the speed to increase the light-emission luminance in the local dimming processing is faster than the speed to increase the light-emission luminance in the global dimming processing, the light source luminance of each of the light-emitting elements quickly follows the luminance around the light-emitting element.

4. Dimming Processing Unit and Color Correction Circuit

Figure 12:
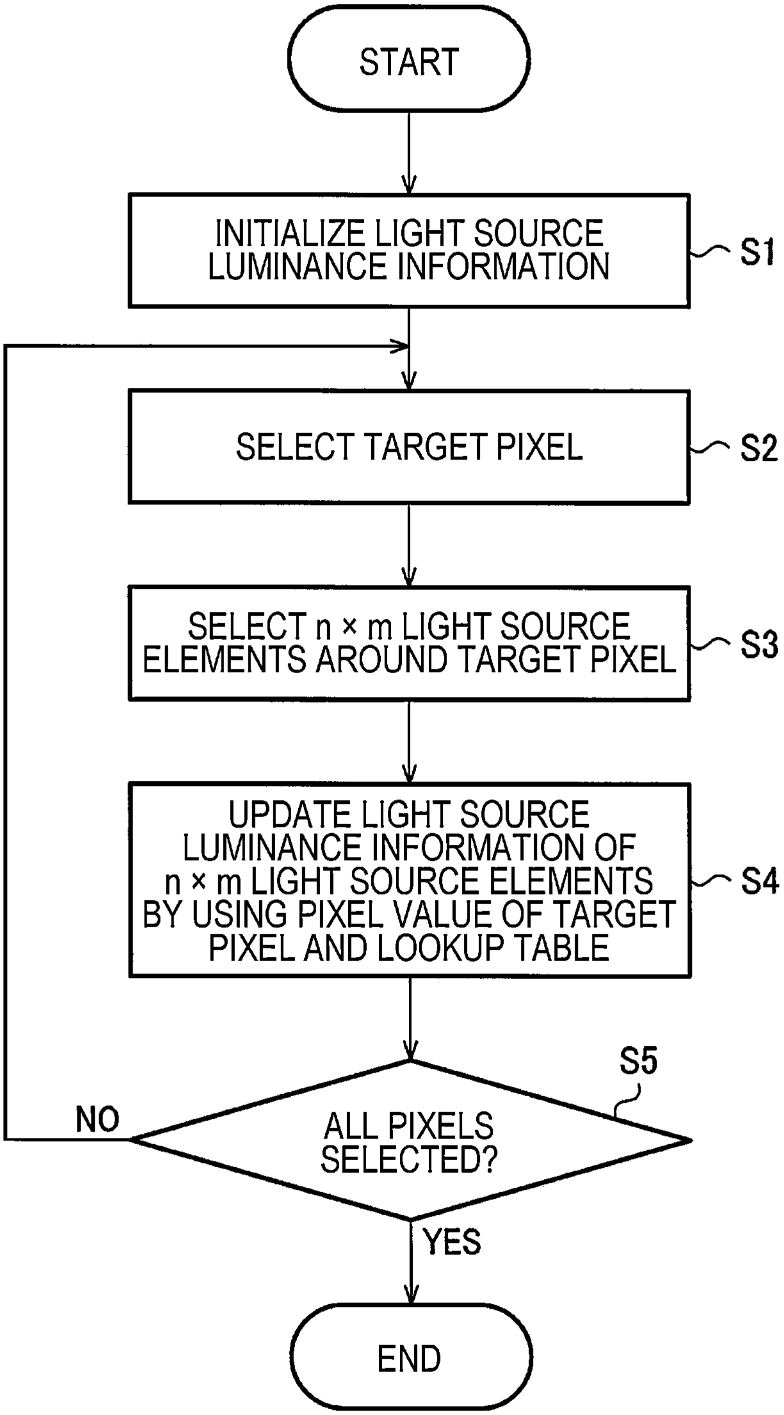
FIG. 12 is a flowchart of processing performed by a dimming processing unit.
Figure 13:
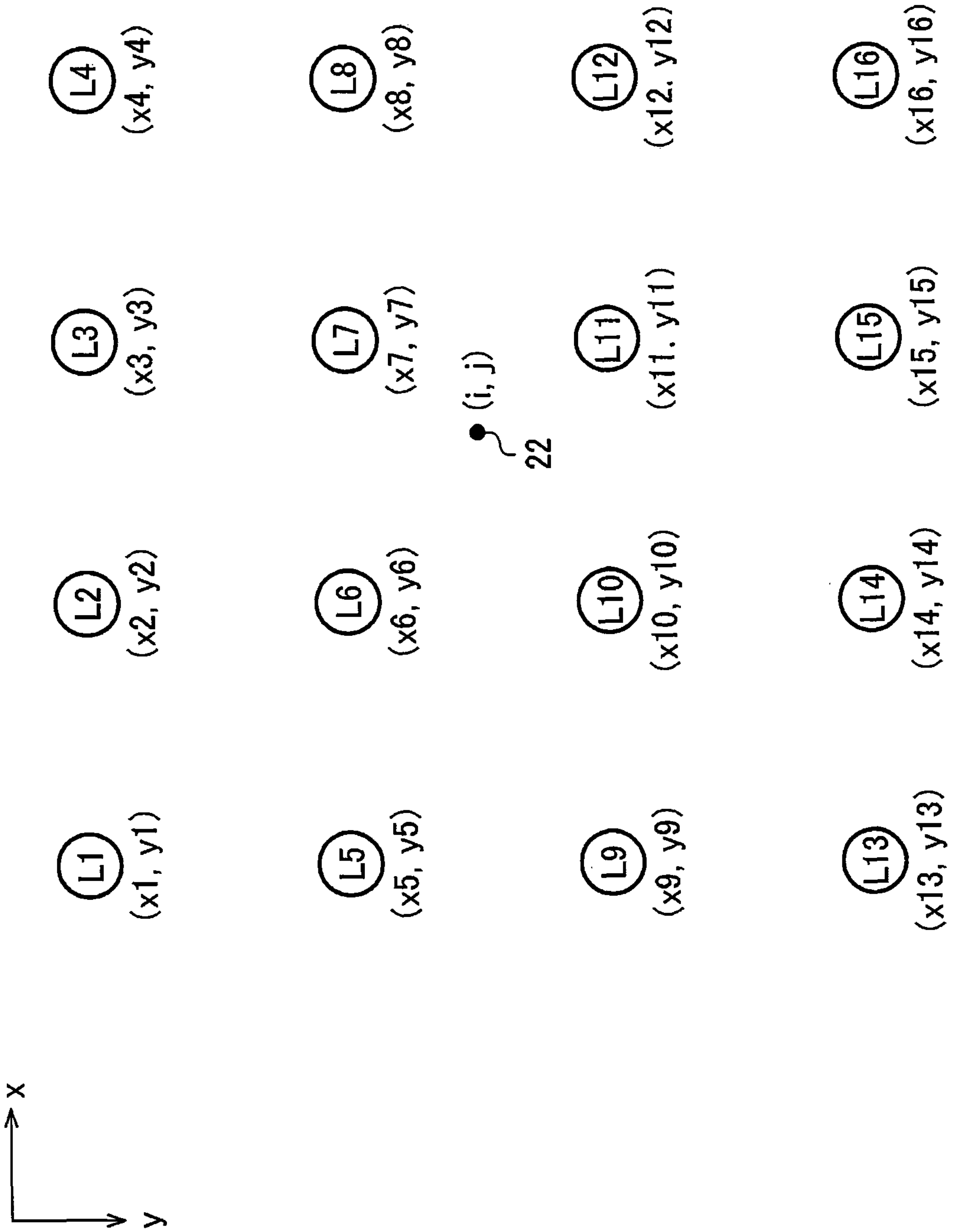
FIG. 13 is a diagram illustrating an example of surrounding light source elements.

FIG. 12 is a flowchart of processing performed by the dimming processing unit. In the following description, an example of surrounding light source elements illustrated in FIG. 13 is used. In FIG. 13, an x-direction is a horizontal scanning direction of the display panel, and a y-direction is a vertical scanning direction of the display panel. In the following description, it is assumed that the luminance information INT is not subjected to down-sampling and the number of pixels of the luminance information INT is equal to the number of pixels of the image data IMA. In this case, (x, y) in FIG. 13 indicates coordinates on the luminance information INT and also indicates coordinates on the input image. In the case where the luminance information INT is subjected to down-sampling, coordinates on the luminance information INT after the down-sampling may be used instead of (x, y) in the dimming processing.

In step S1, the dimming processing unit 152 initializes the light source luminance information. For example, the dimming processing unit 152 initializes the luminance values of all of the light source elements to zero.

In step S2, the dimming processing unit 152 selects one pixel from the pixels in the luminance information INT. The selected pixel is referred to as a target pixel. Through a loop from step S2 to step S5, target pixels are sequentially selected. For example, a first pixel of a first scanning line of the luminance information INT is selected in the first round of step S2, and a second pixel, a third pixel, and the like are sequentially selected in the next and following rounds of step S2, and pixels of a second scanning line are sequentially selected when all the pixels of the first scanning line are selected, and such a process is repeated up to a final scanning line.

In step S3, the dimming processing unit 152 selects n×m light source elements around the target pixel. The n×m light source elements are also referred to as surrounding light source elements, where each of n and m may be an integer of 2 or more.

As illustrated in FIG. 13, a position of a target pixel 22 is set to (i, j), where i and j are integers and the position (i, j) indicates an i-th pixel of a j-th scanning line. In the example of FIG. 13, n=m=4. The dimming processing unit 152 selects light source elements L1 to L16 in the nearest two columns in each of a+x-direction and a−x-direction and in the nearest two rows in each of the +y-direction and the −y-direction with respect to the position (i, j). When k is an integer of 1 or more and 16 or less, a position of a light source element Lk is represented as (xk, yk).

In step S4 of FIG. 12, by using the pixel value of the target pixel 22 in the luminance information INT and the attenuation rate distribution information 171 stored in the storage unit 170, the light source luminance information is updated for each of the n×m light source elements selected in step S3.

In step S5, the dimming processing unit 152 determines whether all of the pixels have been selected as the target pixels, the process ends when all of the pixels have been selected, and the process returns to step S2 when there is any pixel that has not been selected.

A description will be made with respect to update processing of the light source luminance information in step S4. The dimming processing unit 152 obtains, from Formula (1) below, a required variation amount Δij indicating a variation amount required for the amount of light received by the target pixel 22 based on the light source elements L1 to L16.

$$\Delta_{ij} = INT_{i,j} - \sum_{k=1}^{16} lsf(k) \times powc(k) \tag{1}$$

In Formula (1) above, INTij indicates the luminance value of the target pixel 22 in the luminance information INT. The luminance value is the maximum value out of the RGB pixel values of the target pixel 22 in the image data IMA as described above. Alternatively, the luminance value may be a luminance value, for example, Y in a YCrCb space calculated by multiplying the RGB pixel value of the target pixel 22 in the image data IMA by a coefficient. In Formula (1), lsf (k) indicates an attenuation rate of the light with which the light source element Lk illuminates the target pixel 22, and is obtained from an actual attenuation rate distribution or an attenuation rate distribution approximating the actual attenuation rate distribution. The dimming processing unit 152 obtains the lsf (k) by using the attenuation rate distribution information 171. The attenuation rate distribution information 171 is a lookup table or a function. In Formula (1), powc (k) indicates previous light source luminance information of the light source element Lk. The previous light source luminance information is light source luminance information calculated using a previous target pixel selected immediately before the current target pixel 22. The previous target pixel is a pixel at a position (i−1, j) immediately before the position (i, j) in the x-direction.

The dimming processing unit 152 updates the light source luminance information by distributing the required variation amount Δij to the light source luminance information of the light source element Lk by using Formula (2) below.

$$powu(k) = \begin{cases} powc(k) + \Delta_{ij}\dfrac{lsf(k)}{\sum_{\alpha=1}^{16} lsf(\alpha)}, & \text{if } \Delta_{ij} > 0 \\ powc(k), & \text{if } \Delta_{ij} \le 0 \end{cases} \tag{2}$$

In Formula (2) above, powu (k) indicates the current light source luminance information, that is, the light source luminance information after being updated.

Figure 14:
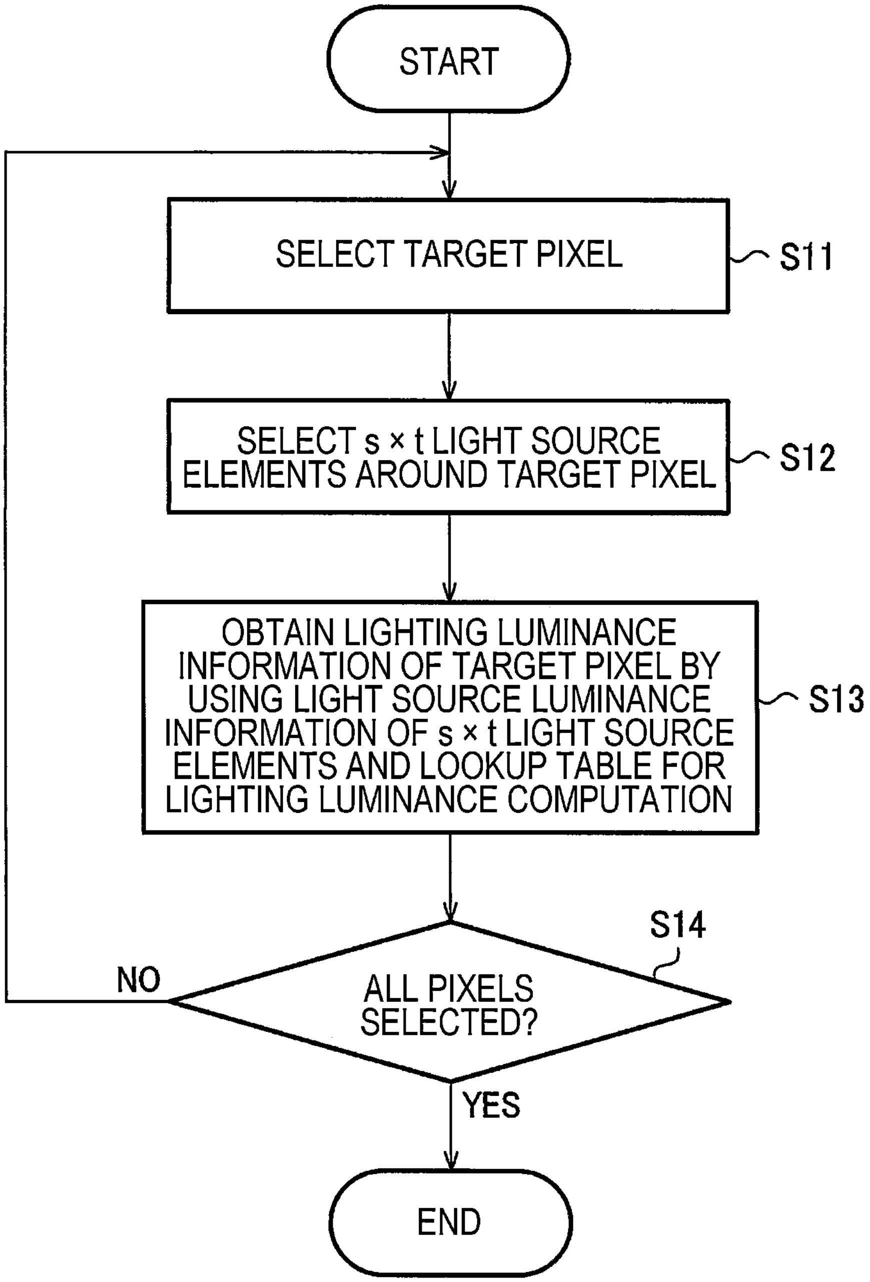
FIG. 14 is a flowchart of lighting luminance computation processing performed by a color correction circuit.

FIG. 14 is a flowchart of lighting luminance computation processing performed by the color correction circuit. Although the example of FIG. 13 is also used herein, the processing performed by the color correction circuit 120 is separated from the processing performed by the dimming processing unit 152. Further, (x, y) is used as the coordinates on the luminance information INT in the description of the dimming processing unit 152, but (x, y) indicates herein coordinates on the input image indicated by the image data IMA.

In step S11, the color correction circuit 120 selects one pixel from the pixels in the image data IMA. The selected pixel is referred to as a target pixel. Through a loop from step S11 to step S14, target pixels are sequentially selected. For example, a first pixel of a first scanning line of the image data IMA is selected in the first round of step S11, a second pixel, a third pixel, and the like are sequentially selected in the next and following rounds of step S11, and pixels of a second scanning line are sequentially selected when all the pixels of the first scanning line are selected, and such a process is repeated up to a final scanning line.

In step S12, the color correction circuit 120 selects s×t light source elements around the target pixel. The s×t light source elements are also referred to as surrounding light source elements, where each of s and t may be an integer of 2 or more. FIG. 13 illustrates an example of s=t=4.

The position of the target pixel 22 is set to (i, j), where i and j are integers and the position (i, j) indicates an i-th pixel of a j-th scanning line. The color correction circuit 120 selects light source elements L1 to L16 in the nearest two columns in each of the +x-direction and the −x-direction and in the nearest two rows in each of the +y-direction and the −y-direction with respect to the position (i, j). When α is an integer of 1 or more and 16 or less, a position of a light source element Lβ is represented as (xβ, yβ).

In step S13, the color correction circuit 120 obtains the lighting luminance information of the target pixel by using the light source luminance information of the selected s×t light source elements and the attenuation rate distribution information 171.

In step S14, the color correction circuit 120 determines whether all of the pixels have been selected as the target pixels, the process ends when all of the pixels have been selected, and the process returns to step S11 when there is any pixel that has not been selected.

A description will be made with respect to computation processing of the light source luminance information in step S13. The color correction circuit 120 obtains the lighting luminance information of the target pixel 22 using Formulae (3) and (4) below.

$$PL(i, j) = \sum_{\beta=1}^{s \times t} pow(\beta) \times lsf(\beta) \tag{3}$$

-continued $$lsf(\beta) = lsf\left((i - x\beta)^2 + (j - y\beta)^2\right) \tag{4}$$

In Formula (3) above, PL (i, j) indicates the lighting luminance information with respect to the pixel at the position (i, j), pow (β) indicates the light source luminance information determined by the dimming processing unit 152, and lsf (β) indicates an attenuation rate of light with which a light source element Lβ illuminates the target pixel 22. The color correction circuit 120 obtains lsf (β) by using the attenuation rate distribution information 171. In Formula (4) above, a square of a distance is used as an input to the lookup table, but the distance may be used as an input to the lookup table.

After the loop of steps S2 to S5 in the flow of FIG. 12 is executed up to the last pixel in the luminance information INT, the powu in Formula (2) above is used as pow in Formula (3) above. Even when the loop of steps S2 to S5 is not executed up to the last pixel in the luminance information INT, the updating of the light source luminance information of the light source elements sequentially ends as the target pixel advances, and thus the light source luminance information for which the updating ends may be used as pow.

The color correction circuit 120 may obtain the lighting luminance information of the target pixel not only from the light source luminance information of the s×t light source elements around the target pixel but also from the light source luminance information of all the light source elements of the backlight 210.

Although the present embodiment has been described in detail above, it will be easily understood by those skilled in the art that various modifications can be made without substantially departing from the novel matters and effects of the present disclosure. Therefore, all such modifications are included in the scope of the present disclosure. For example, the terms described together with different terms having a broader meaning or the same meaning at least once in the specification or the drawings can be replaced with the different terms in any part in the specification or the drawings. Further, all combinations of the present embodiment and the modifications may be within the scope of the present disclosure. Furthermore, the configuration, the operation, and the like of the circuit device, the backlight, the display device, the display system, the processing device, the electronic apparatus, and the like are not limited to those described in the present embodiment, and various modifications can be implemented.

What is claimed is:

1. A circuit device that controls a display device including light source elements and a display panel, the circuit device comprising:

a luminance analysis circuit that performs luminance analysis on image data of an input image to output luminance information; and a dimmer circuit that performs local dimming processing for dimming each of the light source elements based on the luminance information and global dimming processing using a global dimming parameter based on a sensor output of an ambient light sensor, to determine light source luminance information indicating light-emission luminance of each of the light source elements, wherein the dimmer circuit performs dimming processing in which a speed to change the light-emission luminance in the global dimming processing is slower than a speed to change the light-emission luminance in the local dimming processing.

2. The circuit device according to claim 1, wherein the dimmer circuit performs first filter processing on the global dimming parameter based on a first time constant to make the speed to change the light-emission luminance in the global dimming processing slower than the speed to change the light-emission luminance in the local dimming processing.

3. The circuit device according to claim 2, wherein the dimmer circuit performs second filter processing, based on a second time constant shorter than the first time constant, on a result of the local dimming processing.

4. The circuit device according to claim 1, wherein the dimmer circuit receives, from outside of the circuit device, the global dimming parameter subjected to first filter processing based on a first time constant, and the dimmer circuit determines the light source luminance information by using a result of the local dimming processing and the global dimming parameter.

5. The circuit device according to claim 1, wherein the dimmer circuit performs the dimming processing in which a speed to decrease the light-emission luminance in the global dimming processing is slower than a speed to decrease the light-emission luminance in the local dimming processing.

6. The circuit device according to claim 1, wherein the dimmer circuit performs the dimming processing in which a speed to increase the light-emission luminance in the local dimming processing is faster than a speed to increase the light-emission luminance in the global dimming processing.

7. The circuit device according to claim 1, further comprising a color correction circuit that performs, based on the light source luminance information, color correction on the image data.

8. A display system comprising:

the circuit device according to claim 1; and the display device.

* * * * *